United States Patent [19]
Holliday, III et al.

[11] Patent Number: 6,118,974
[45] Date of Patent: Sep. 12, 2000

[54] CEBUS NODE ZERO SWITCHING DEVICE

[75] Inventors: Cornelius E. Holliday, III, Houston; Edward C. Nichols, Pittsburgh, both of Pa.; Robert W. Parry, Santa Cruz, Calif.; Michael T. Jennison, Bridgeville, Pa.

[73] Assignee: Jennison Holding, Inc., Carnegie, Pa.

[21] Appl. No.: 08/797,446

[22] Filed: Feb. 6, 1997

(Under 37 CFR 1.47)

[51] Int. Cl.$^7$ .................................................. H04N 7/10
[52] U.S. Cl. .................................. 455/3.1; 348/11; 348/6
[58] Field of Search .................................. 348/11, 6, 12, 348/10; 455/3.1, 6.3, 4.1, 4.2

[56] References Cited

U.S. PATENT DOCUMENTS

| | | | |
|---|---|---|---|
| 4,530,008 | 7/1985 | McVoy | 348/11 |
| 5,193,208 | 3/1993 | Yokota et al. | 455/6.3 |
| 5,485,670 | 1/1996 | Lee et al. | 455/4.1 |
| 5,812,928 | 9/1998 | Watson, Jr. et al. | 348/11 |

OTHER PUBLICATIONS

"Physical and Media Specifications of the CXBus"; O'Brian, Jr.; IEEE Transaction on Consumer Electronics; vol. 37 # 3 Aug. 1991 pp. 359–366.

Primary Examiner—Victor R. Kostak
Attorney, Agent, or Firm—Cohen & Grigsby, P.C.

[57] ABSTRACT

The present invention presents a multimedia signal distribution device that implements the Electronics Industry Association (EIA) "Node Zero" standard for a Consumer Electronics Bus (CEBus) signal distribution network. The preferred embodiment of the present invention comprises a block frequency conversion loop that is combined with other conventional electronic devices to accomplish the multimedia signal frequency conversion, filtering and distribution functions required of the ideal Node Zero device set forth in the EIA CEBus standard. The present invention preferably implements the CEBus block frequency conversion, input and output band-pass filtering, and signal amplification requirements by a block frequency conversion loop comprised of the following components which process the internal signal block in the following series order: (a) passive first low-pass or band-pass filter; (b) a 1000 MHz first frequency mixer; (c) an intermediate frequency (IF) filter; (d) a 38 dB signal amplifier; (e) a selectable second frequency mixer and (f) a tunable second low-pass or band-pass filter 11. Optionally, a broad-band quadrature signal phase shifting device may be implemented in conjunction with a signal coupling balun transformer at the input and output, respectively, of the first frequency mixer. This quadrature phase shifting improves the filtering of the internal signal block after the quadrature outputs have been shifted by the first frequency mixer to an intermediate frequency (IF) signal range.

47 Claims, 5 Drawing Sheets

PLL BLOCK DIAGRAM

CEBUS NODE ZERO SWITCHING DEVICE

FIELD OF THE INVENTION

The present invention presents a multimedia signal distribution device that implements the Electronics Industry Association (EIA) "Node Zero" standard for a Consumer Electronics Bus (CEBus) signal distribution network.

BACKGROUND OF THE INVENTION

The Consumer Electronic Bus (CEBus) is a multimedia LAN standard approved for use by the Electronics Industry Association's Consumer Electronics Bus Committee. CEBus provides a standard communication interface to each of six different media. These media include: PLBus (Power Line Bus), TPBus (Twisted-Pair Bus), CXBus (Coaxial Bus), IRBus (Infrared Bus), RFBus (Radio Frequency Bus) and FOBus (Fiber-Optic Bus). CEBus comprises media with data channels and a control channel. The control channel carries commands used to allocate the data channels, as well as short messages. The data channels carry a variety of signals which do not fit within the bandwidth constraints of the control channel. The control channel is digital, whereas the data channels may carry signals of any type.

The CXBus network provides the information necessary to facilitate the exchange of data and control information over the coaxial cable medium within a home. The detailed description of the CXBus network may be found in the "CX Specification, IS-60.3 Coax Physical Layer and Media Specifications", revised Mar. 19, 1992, which is incorporated herein by reference for its teachings on CXBus topologies, media and devices, including "Node Zero" definition. CXBus is also described in O'Brien Jr., "Physical and media specifications of the CXBus", IEEE Transactions on Consumer Electronics, Vol. 37, Number Aug. 3, 1991, which is incorporated by reference herein for its teachings on CXBus networks. A publication by J. Hofmann entitled "The Consumer Electronic Bus: an Integrated Multi-Media LAN for the Home", International Journal of Digital and Analog Communication Systems, Vol. 4, 77–86, (1991), (which is incorporated herein by reference for its teachings on CEBus network architectures) describes issues related to frequency placement of block converted signals.

CXBus network configurations support all anticipated coax connected appliances in the home. The CXBus distribution system includes a collection of coaxial cable pairs that originate at a special node distribution device called "Node Zero" in FIG. 1. This dual cable approach provides sufficient spectrum space for externally generated signals from either a Cable Television (CATV) cable or Off-Air (i.e., from an outside antenna), as well as the video and audio signals generated within the home (e.g., from a video cassette recorder or surveillance cameras). The two cables of this cable pair are described as "external" cable and "internal" cable respectively. The CXBus network may be a single independent network, or the CXBus network may also be interconnected with other CXBus networks or different CEBus media.

The present invention provides a multimedia signal distribution device that implements the Electronics Industry Association (EIA) "Node Zero" standard for a Consumer Electronics Bus (CEBus) signal distribution network that utilizes a unique block frequency conversion circuit to provide an improved wide-bandwidth block frequency conversion of incoming baseband signals not found in the current state of the art. The block conversion circuit of the present invention accomplishes this wide-bandwidth conversion by providing a double frequency shift conversion circuit which permits filtering and amplification of the incoming signals at intermediate (IF) frequencies which are much higher than either the baseband frequencies of the incoming signals or the frequencies of the converted signals output from the device. This double frequency shift IF conversion, filtering and amplification scheme allows the elimination of undesired harmonic frequency sideband components which degrade the output signal in current Node Zero designs. The circuit design of the present invention provides a cost-effective approach to wide-bandwidth signal reception capability for the Node Zero standard through its unique double shift IF conversion, filtering and amplification scheme.

Accordingly, it is an object of the present invention to provide a multimedia signal distribution device that implements the Electronics Industry Association (EIA) "Node Zero" standard for a Consumer Electronics Bus (CEBus) signal distribution network.

It is a further object of the present invention to provide a multimedia "Node Zero" signal distribution device that utilizes a unique block frequency conversion circuit to provide an improved wide-bandwidth block frequency conversion of incoming baseband signals.

It is a further object of the present invention to provide a multimedia "Node Zero" signal distribution device that accomplishes wide-bandwidth frequency conversion by providing a double frequency shift block conversion circuit.

It is a further object of the present invention to provide a double frequency shift block conversion circuit which permits filtering and amplification of the incoming signals at intermediate (IF) frequencies which are much higher than either the baseband frequencies of the incoming signals or the frequencies of the converted output signals.

It is a further object of the present invention to provide a double frequency shift block conversion circuit which allows the elimination of undesired harmonic frequency sideband components which degrade the output signal.

It is a further object of the present invention to provide a multimedia "Node Zero" signal distribution device which provides a cost-effective approach to wide-bandwidth signal reception capability for the Node Zero standard through a unique double shift IF conversion, filtering and amplification scheme.

SUMMARY OF THE INVENTION

The present invention presents a multimedia signal distribution device that implements the Electronics Industry Association (EIA) "Node Zero" standard for a Consumer Electronics Bus (CEBus) signal distribution network. The preferred embodiment of the present invention comprises a block frequency conversion loop that is combined with other conventional electronic devices to accomplish the multimedia signal frequency conversion, filtering and distribution functions required of the ideal Node Zero device set forth in the EIA CEBus standard.

The present invention preferably implements the CEBus block frequency conversion, input and output band-pass filtering, and signal amplification requirements by a block frequency conversion loop comprised of the following components which process the internal signal block in the following series order: (a) passive first low-pass or band-pass filter; (b) a 1000 MHz first frequency mixer; (c) an intermediate frequency (IF) filter; (d) a 38 dB signal amplifier; (e) a selectable second frequency mixer and (f) a tunable second low-pass or band-pass filter 11.

Optionally, a broad-band quadrature signal phase shifting device may be implemented in conjunction with a signal coupling balun transformer at the input and output, respectively, of the first frequency mixer. This quadrature phase shifting improves the filtering of the internal signal block after the quadrature outputs have been shifted by the first frequency mixer to an intermediate frequency (IF) signal range.

Other details, objects, and advantages of the present invention will become apparent in the following description of the presently preferred embodiments.

BRIEF DESCRIPTION OF THE DETAILED DRAWINGS

FIG. (1) is a block diagram of the Electronics Industry Association (EIA) "Node Zero" standard for a Consumer Electronics Bus (CEBus) signal distribution network.

FIG. (2) is a block diagram of the presently preferred embodiment of the block frequency conversion loop of the present invention.

FIG. (3) is a block diagram of an alternate embodiment of the block frequency conversion loop of the present invention.

FIG. (4) is an example block diagram of a voltage controlled oscillator circuit incorporating a phase-lock loop as used in the present invention.

FIG. (5) is an example block diagram of an in-phase and quadrature-phase (IQ) detector as used in the present invention.

DETAILED DESCRIPTION OF THE PRESENTLY PREFERRED EMBODIMENTS

Figure 1:
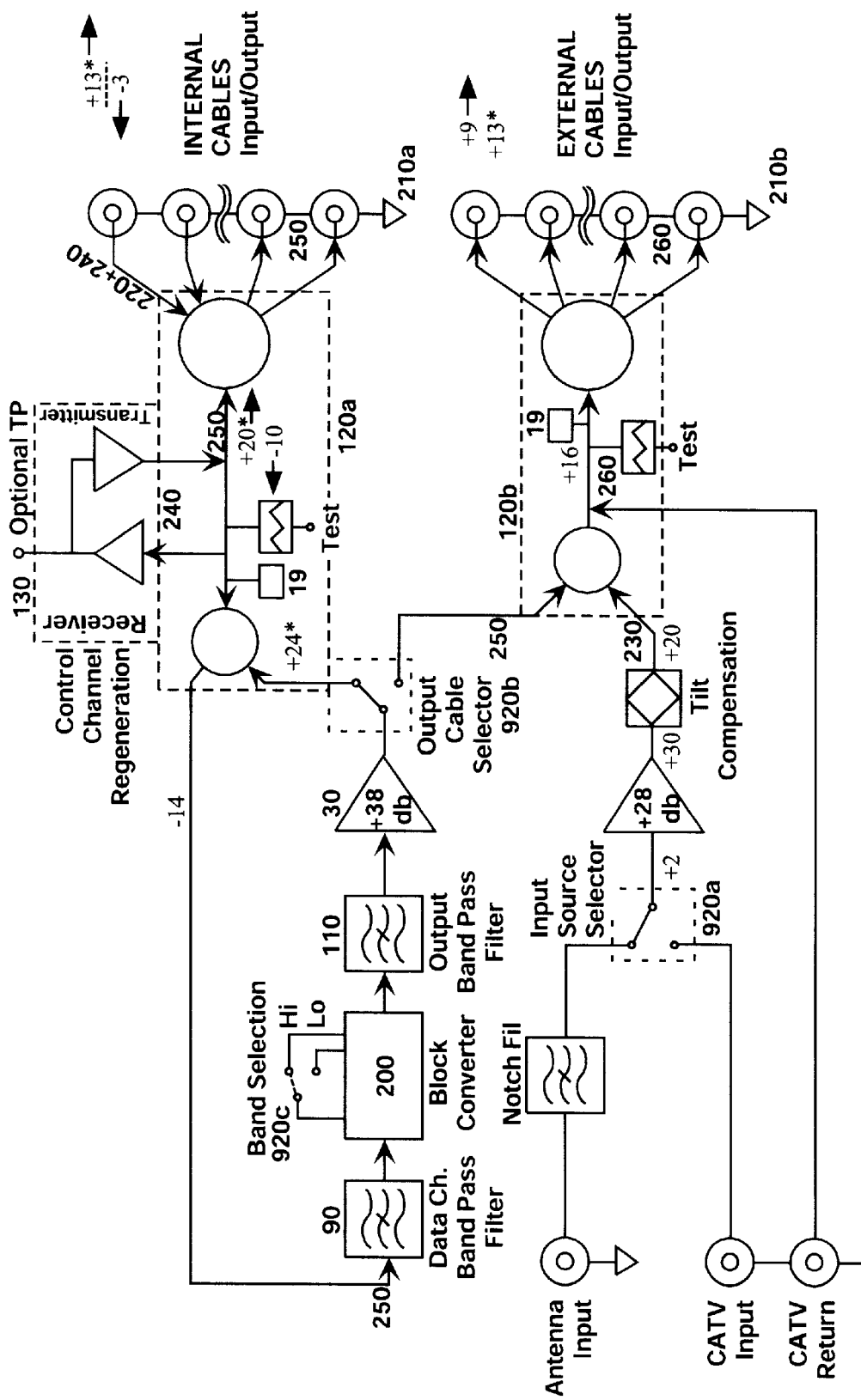
Figure 2:
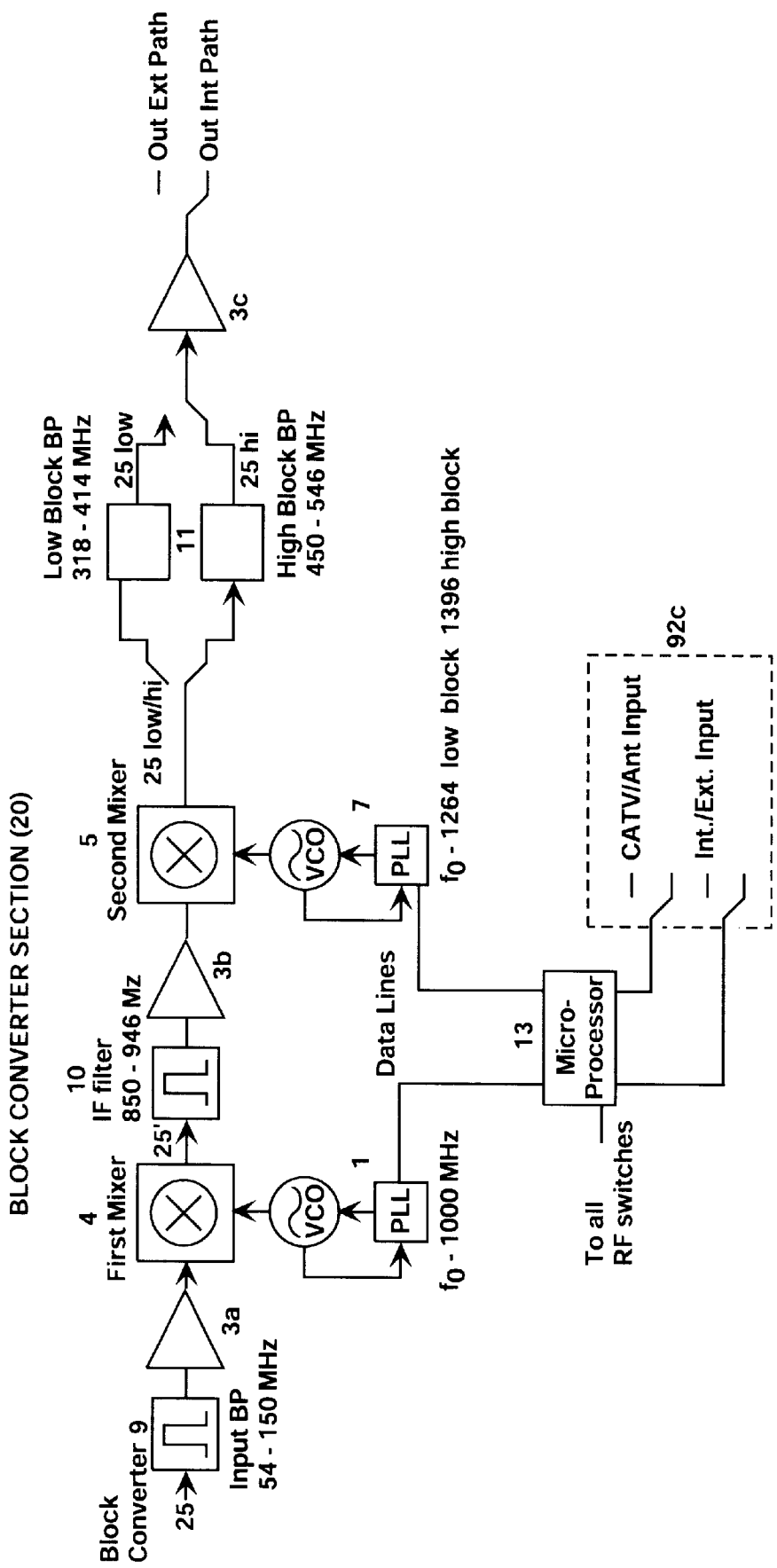
Figure 3:
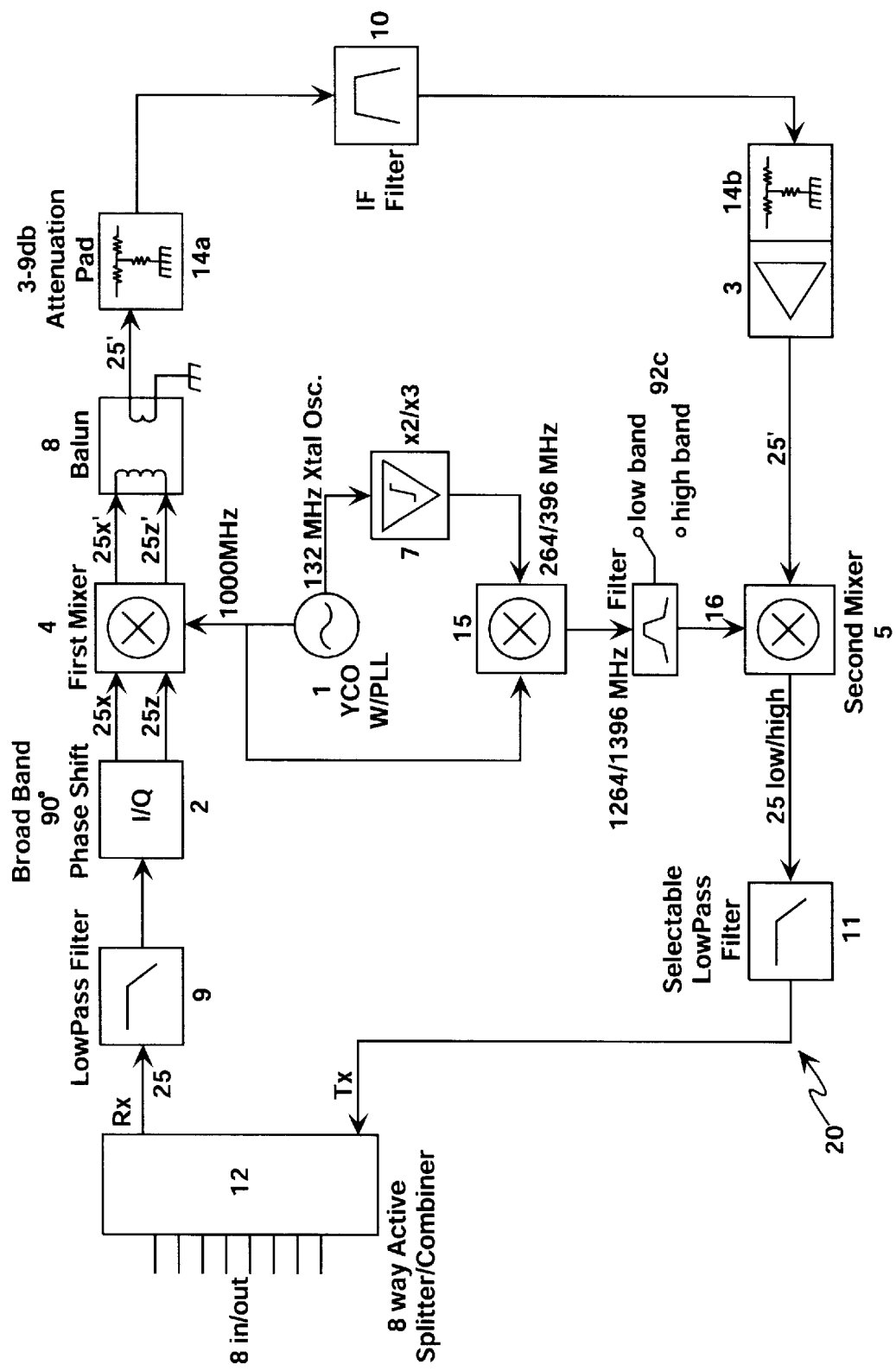
Figure 4:
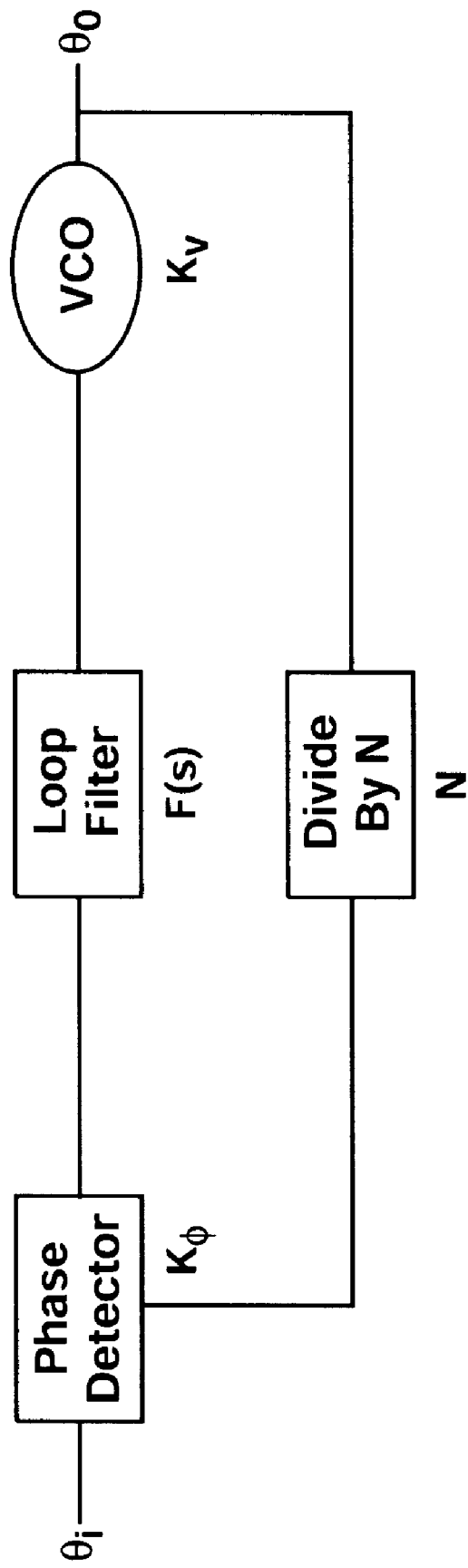
Figure 5:
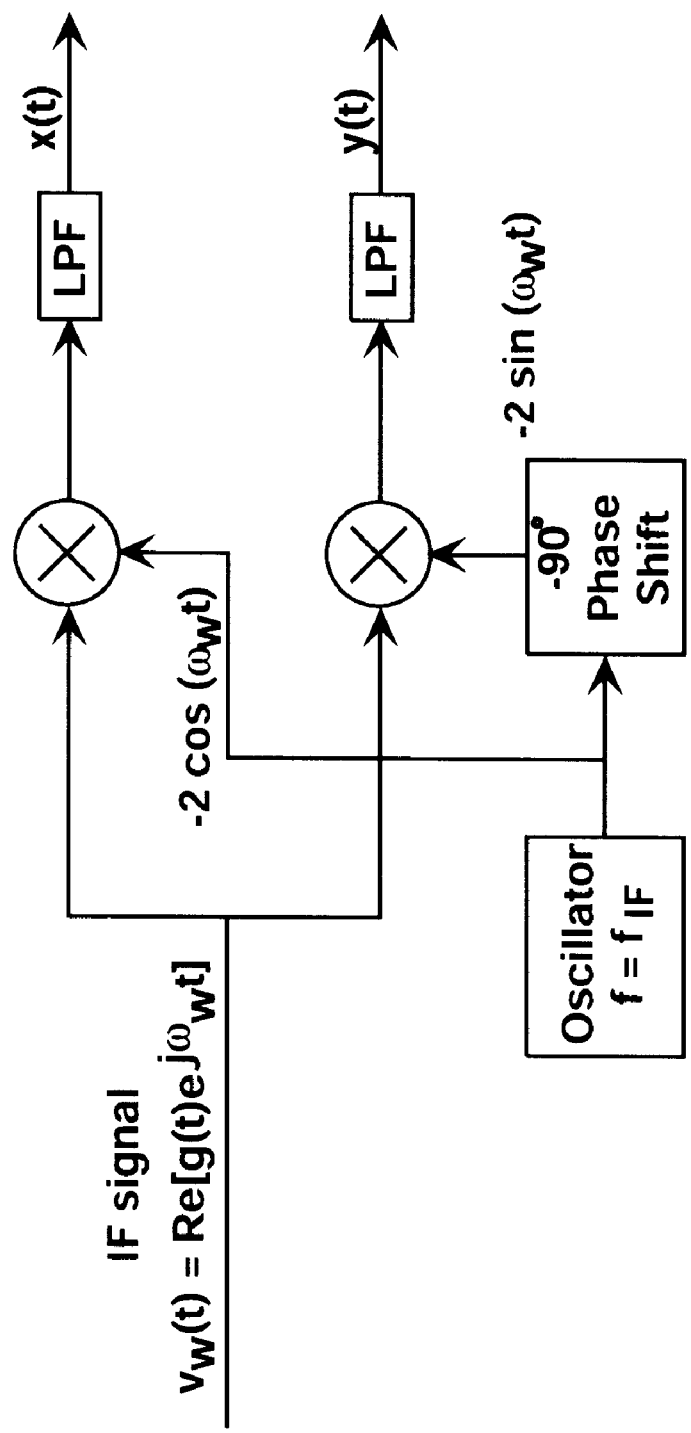

The present invention presents a multimedia signal distribution device that implements the Electronics Industry Association (EIA) "Node Zero" standard for a Consumer Electronics Bus (CEBus) signal distribution network. As shown in FIG. (2), the preferred embodiment of the present invention comprises a block frequency conversion loop 20 that is combined with other conventional electronic devices to accomplish the multimedia signal frequency conversion, filtering and distribution functions required of the ideal Node Zero device set forth in the EIA CEBus standard and shown in FIG. (1).

Referring to FIG. (1), the CEBus standard requires an interface device 120a for receiving and combining baseband (or non-frequency shifted) signals into a signal block 250 lying within the 54–150 MHz range as the individual signals 220 are transmitted from various CEBus network nodes 210a and/or 210b that contain sources which originate signals internal to the home. These internal signal sources can include television video cassette recorders (VCRs), closed-circuit television cameras, compact disk machines, radio receivers, audiocassette players, phonograph players, telephones, facsimile machines, computers and other electronic communication appliances. This interface device 120a preferably retransmits the combined internal signal block 250 to all other nodes 210a receiving signals from internal signal sources after it has been shifted by a block frequency conversion circuit 200 into the 450–546 MHz frequency band.

A different interface device 120b preferably receives signals 230 from external sources such as a conventional off-air antenna or a Community Access Television (CATV) cable network, radio signal transmitters, communications satellites, telephone networks and computer networks and other electronic communication appliances. Interface device 120b preferably re-transmits these external signals 230 to all nodes 210b receiving signals from external signal sources, after they have been combined into a single signal block 260 with the internal signal block 250, which will have been shifted by the block frequency conversion circuit 200 into either the 318–414 MHz band or the 450–546 MHz band, depending on whether an off-air antenna or CATV is being used, respectively. Typically a single node 210 will receive all internal 250 and external 230 signals in addition to transmitting one internal signal 220, but an internal signal can be transmitted from one node and received only at different nodes, and an external signal can be received at nodes different from those receiving internal signals.

Each internal signal 220 received by interface device 120a has been combined at the internal signal source with a control signal 240 for demodulation and decoding of the internal signal at an internal signal receiving device. The signal block 250 output from interface device 120a thus includes both a combined block of internal signals 220 as well as a combined block of control signals 240. The control signal block 240 is separated from the internal signal block 220 by a control channel regeneration circuit 130 as shown in the CEBus standard depicted in FIG. (1). The control channel regeneration circuit 130 processes the control signal block 240 in parallel with processing of the internal signal block 220 by the block frequency conversion circuit 200. The control signal block 240 is then re-combined with the internal signal block 220 by interface device 120a for re-distribution to the network nodes 210.

As shown in FIG. (2), an eight input/output splitter/combiner 12 preferably implements each interface device 120a or 120b, but a splitter/combiner 12 with more or less than eight input/outputs can be utilized depending on the number of node sites within the home. Any conventional active splitter/combiner 12 can be used for this purpose, examples of which is the active filter/amplifier/resistive combiner network shown in FIG. (3) of U.S. Pat. No. 5,485,630 and the splitter/combiner design in U.S. patent application Ser. No. 08/651,629, the disclosures of both of which are incorporated herein by reference. The number of node sites can optionally and preferably be multiplied by the use of additional splitter/combiners 12 branching from one or more node 21 internal/external cable pairs.

Referring again to FIG. (1), the CEBus standard requires input band-pass filtering 90 of the internal signal block 250. This input filtering 90 is designed to eliminate the control signals and extraneous frequency-shifted signals that may have been fed back into the block frequency conversion circuit 200 loop at the output of interface device 120a. This filtering 90 leaves only a block of non-frequency shifted internal signals 250 within the baseband frequency range of 54–150 MHz to be processed by the block frequency conversion circuit 200. Referring again to FIG. (1), the CEBus standard requires a circuit 200 for frequency conversion of the filtered baseband internal signal block 250 into either the 318–414 MHz band or the 450–546 MHz band before re-transmission to either the internal or external nodes 210a or 210b, respectively. The CEBus standard requires the internal signal block 250hi to be re-transmitted in the 450–546 MHz band back to internal nodes 210a. The CEBus standard requires the internal signal block 250low to be re-transmitted in the low frequency (318–414 MHz) band to external nodes 210b if an-off air antenna is being used as the external signal source. Finally, the CEBus standard requires the internal signal block 250hi to be re-transmitted in the high frequency (450–546 MHz) band to external nodes 210b if CATV is being used as the external signal source.

An input source selector switch 920a is used to select either an off-air antenna or CATV as the external signal source 230. The position of this input source selector switch 920a, in concert with the position of the output cable selector switch 920b, determines the position of the band selection switch 920c. The band selection switch 920c will tune the block frequency conversion circuit 200 to the low frequency band 250low if the input source selector switch 920a is in the off-air antenna position while the output cable selector switch 920b is positioned to select re-transmission of the combined internal and external signal block 260 to the external nodes 210b. Conversely, the band selection switch 920c will tune the block frequency conversion circuit 200 to the high frequency band 250hi if the input source selector switch 920a is in the CATV position while the output cable selector switch 920b is positioned to select re-transmission of signal block 260 to the external nodes 210b. Finally, the band selection switch 920c will tune the block frequency conversion circuit 200 to the high frequency band 220hi if the output cable selector switch 920b is positioned to select re-transmission of only the internal signal block 250 to the internal nodes 210a.

Finally referring to FIG. (1), the CEBus standard requires output band-pass filtering 110 and amplification 30 of the frequency converted internal signal block 250 before re-transmission by the interface device 120a to either the internal nodes 210a or through interface device 120b to the external nodes 210b. The output filtering requirement 110 is designed to eliminate any extraneous noise and harmonics outside the re-transmission frequency range before the frequency converted internal signal block 250 is re-delivered to other nodes 210a or 210b. The 38 dB amplification requirement 30 is necessary to provide sufficient signal strength for adequate reception of the frequency converted internal signal block 250 at each individual node 210a or 210b after the internal signal block 250 has been split by interface device 120a or 120b.

Referring to FIG. (2), the CEBus block frequency conversion 200, input and output band-pass filtering 90 and 110, and signal amplification 30 requirements are preferably all implemented in the present invention by a frequency conversion loop 20 comprised of the following components which process the internal signal block 25 in the following series order: (a) passive first low-pass or band-pass filter 9 (b) a 1000 MHz first frequency mixer 4; (c) an intermediate frequency (IF) filter 10; (d) a 38 dB signal amplifier 3b; (e) a selectable 1264 MHz/1396 MHz second frequency mixer 5; and (f) a tunable second low-pass or band-pass filter 11.

Optionally, as shown in FIG. (3), a broad-band quadrature signal phase shifting device 2 may be implemented in conjunction with a signal coupling balun transformer 8 at the input and output, respectively, of the first frequency mixer 4. Also, as shown in FIGS. (2) and (3), respectively, amplifiers 3a and 3c and signal attenuation pads 14a and 14b may be placed in the block frequency conversion circuit 20 at desired locations to further amplify and attenuate the signal during processing.

Referring to FIGS. (2) and (3), the CEBus standard input band-pass filtering requirement 90 is preferably implemented by a filter 9 which passes signals up to a corner frequency of approximately 150 MHz and which rejects signals above that frequency. This filter 9 is preferably a conventional discrete component passive filtering network similar to that shown in FIG. (9) of U.S. Pat. No. 5,485,630, but the low pass filter 9 can also be implemented by active filtering networks that utilize electronic components and/or digital signal processing techniques.

Referring to FIG. (2), the internal signal block 25 output from filter 2 is shifted at least 1000 MHz by first frequency mixer 4 from the baseband 54–150 MHz frequency range to yield an intermediate frequency (IF) signal block 25' in the 1054–1150 MHz range. The first frequency mixer 4 is preferably an analog solid-state mixing circuit driven by a first voltage controlled oscillator (VCO) incorporating a conventional phase-lock loop (PLL) circuit 1 to maintain the carrier frequency at 1000 MHz. A block diagram of one possible embodiment of the VCO/PLL circuit is shown in FIG. (4). It consists of a phase detector that receives a feedback signal from the first VCO coupled to a loop filter that dictates the speed with which the PLL restores the first VCO to its 1000 MHz frequency. The first VCO is preferably of discrete electronic component design, although some digital integrated circuit designs would also be suitable. The phase detector is preferably an analog mixing circuit using a solid-state nonlinear mixing element although certain digital mixing circuits could also be used. The loop filter is preferably implemented by a passive discrete component design, but an active loop filter may also be used. Examples of suitable commercially available VCOs are models POS-1060 and POS-1400 manufactured by Minicircuits, and model M3500C0916S manufactured by Micronetics. Examples of suitable commercially available phase lock loop circuits include models such as Motorola MC 145901F and National Semiconductor model LMX233xA.

The IF internal signal block 25' output from first frequency mixer 4 is then passed through an IF band-pass filter 10. The IF filter 10 removes all of the harmonic frequency sideband components of the IF internal signal block 25' prior to amplification. This IF filter 10 is preferably a conventional passive band-pass filtering network similar to that shown in FIG. (9) of U.S. Pat. No. 5,485,630, but the IF filter 10 can also be implemented by active filtering networks that utilize electronic components and/or digital signal processing techniques.

Referring to FIG. (3), prior to input to the IF filter 10 input signal block 25 may alternately be passed through a broad-band quadrature signal phase shifting device 2 to convert the filtered baseband internal signal block 25 into two output signal blocks 25x and 25z in the baseband frequency range which are 90 degrees out of phase (or in quadrature) with respect to each other. This quadrature phase shifting improves the filtering of the internal signal block 25 after the quadrature outputs 25x and 25z have been shifted by the first mixer 4 to an intermediate frequency (IF) signal range. The quadrature phase shifting device 2 is preferably implemented by a conventional in-phase and quadrature-phase (IQ) detector similar to that shown in FIG. (5). The signal blocks 25x and 25z output from the quadrature phase shifting device 2 are then separately shifted 1000 MHz by first frequency mixer 4 from the baseband 54–150 MHz frequency range to yield two intermediate frequency (IF) signal blocks 25x' and 25z' in the 1054–1150 MHz range as described above, which are in quadrature with respect to each other. The IF quadrature signals 25x' and 25z' produced by first frequency mixer 4 are then combined in transformer 8 which couples the quadrature IF signals 25x' and 25z' back together at the output side of the transformer 8 thus eliminating the phase difference between them to re-produce a single IF internal signal block 25' in the 1054–1150 MHz frequency range. The transformer 8 of the preferred embodiment is preferably a Balun-type design.

As shown in FIGS. (2) and (3), the filtered IF internal signal block 25' is preferably amplified 38 dB by a signal amplifier 3b. Amplifier 3b implements the CEBus standard 38 dB amplification requirement 30 necessary to provide sufficient signal strength for adequate reception of the frequency converted internal signal block 25 at each individual node 21 after the signal block has been split by interface device 12a or 12b. Amplifier 3b is preferably implemented by a conventional solid-state electronic amplification circuit configuration having relatively high gain and low noise, but other types of amplifiers utilizing integrated circuits including operational amplifiers and other combinations could also be used.

The first VCO/PLL 1 1000 MHz signal is mixed with one of two signals generated by a second VCO/PLL 7. As shown in FIG. (2), the second VCO/PLL 7 preferably directly generates dual 1264 MHz and 1394 MHz IF mixing signals. Alternately, as shown in FIG. (3), the signals generated by second VCO 7 can be double (264 MHz) and triple (396 MHz) frequency multiples of a 132 MHz sideband signal produced by the first VCO 1, which are then mixed 15 with the 1000 MHz base frequency signal from first VCO 1 to produce the 1264 MHz and 1396 MHz IF mixing signals. The 1264 MHz and 1394 MHz IF mixing signals are then combined in a second frequency mixer 5 with the IF internal signal block 25' output from amplifier 3b to produce dual output signal blocks 25low and 25hi. Mixing the low frequency (1364 MHz) IF mixing signal with the IF internal signal block 25' will produce an output signal block 25low in the low frequency (318–414 MHz) band. Mixing the high frequency (1496 MHz) IF mixing signal with the IF internal signal block 25' will produce an output signal block 25hi in the high frequency (450–546 MHz) band. Selection of the desired output signal block 25low or 25hi is accomplished in tunable low-pass or band-pass output filter 11. Output filter 11 is similar in design to input filter 9, with the exception that output filter 11 is selectively tunable to a corner frequency of either 414 MHz (to pass signal block 25low) or 546 MHz (to pass signal block 25hi) dependent on the position of band selection switch 92c in either the low frequency position or the high frequency position, respectively. Output filter 11 passes only the low frequency 318–414 MHz) output signal block 25low to the second frequency mixer 5 when band selection switch 92c is placed in the low frequency band position as described above. Conversely, output filter 11 will pass only the high frequency (450–546 MHz) output signal block 25hi when band selection switch 92c is placed in the high frequency band position as described above. Microprocessor 13 preferably controls the switching sequences described above. Suitable microprocessors include model PIC 16C84 by Microchip Devices and Zilog Model Z86C04.

Alternately, as shown in FIG. (3), a tunable band-pass filter 16 passes either only the low frequency (1264 MHz) IF mixing signal to the second frequency mixer 5 when band selection switch 92c is placed in the low frequency band position, or only the high frequency (1396 MHz) IF mixing signal to second frequency mixer 5 when band selection switch 92c is placed in the high frequency band position. Mixing of the selected IF mixing signal with the IF internal signal block 25' in second frequency mixer 5 produces a single output signal block 25low or 25hi, which is then filtered by tunable output filter 11 as described above. After being filtered by output filter 11 the selected frequency converted output signal block 25low or 25hi is re-transmitted through splitter/combiner 12 to the internal nodes 21a or external nodes 21b for distribution as described above.

The block converter 20 can be alternately configured to provide for a single direct frequency shift into either the low frequency (318–414 MHz) output signal band 25low or the high frequency (450–546 MHz) output signal band 25hi by bypassing the IF filter 10, amplifier 3b and second mixer 5 shown in FIG. (2). In that case, the frequency at first mixer 4 would be maintained at either 264 MHz for to produce output signal band 25low or at 396 MHz to prodUe output signal band 25hi.

The CEBus standard control channel regeneration function 130 is implemented in a manner similar to that shown in FIGS. (4)–(6) of U.S. Pat. No. 5,485,630. Splitter/combiner 12 outputs combined internal and control signal block 25 to a conventional directional coupler as shown in FIG. (4) of U.S. Pat. No. 5,485,630, where signal 25 is split. Control channel signal block 24 is then separated from the internal signal block 22. Control channel signal block 24 is then processed in a control channel regeneration circuit similar to that shown in FIG. (6) of U.S. Pat. No. 5,485,630. Regenerated control channel signal block 24 is then re-combined with the frequency shifted internal signal block 22 output from frequency conversion loop 20 in a manner similar to that shown in FIG. (5) of U.S. Pat. No. 5,485,630 for re-distribution by splitter/combiner 12 to network nodes 21.

The present invention optionally and preferably provides capability for future utilization of the CEBus standard Node Zero distribution scheme in a multimedia setting. Modular RJ45 communications plugs (not shown) preferably provide inputs to splitter/combiner 12 or 12a for telephone, facsimile and computer communications networks over POTS and Integrated Data Services Network (ISDN) communication links. Additionally, as shown by the AC/DC power taps 19 in FIG. (1), the device can be used to route other types of electrical signals such as power signals in addition to or in lieu of communications signals.

While presently preferred embodiments of practicing the invention has been shown and described with particularity in connection with the accompanying drawings, the invention may otherwise be embodied within the scope of the appended claims. It is to be understood that circuit component model numbers and values described herein and shown in the accompanying drawings are for purposes of illustrating with particularity the implementation of one preferred embodiment of the present invention, and are in no way to be construed as limiting the invention to only the component models or values shown. To the contrary, it will be obvious to one skilled in the art that other circuit components could be substituted for those shown to allow the invention to otherwise be embodied within the scope of the following claims.

What is claimed is:

1. A system for distributing a plurality of electrical signals input from at least one signal source for output to at least one signal receiving device, comprising:

A. at least one interface device for receiving and combining said input signals into an input signal block within a predetermined frequency range;

B. at least one frequency conversion device electrically connected to at least one said interface device for receiving and shifting said input signal block from said frequency range to at least one other frequency range for conversion to a converted frequency range;

wherein at least one said interface device receives said frequency converted signal block from at least one said frequency conversion device for output to at least one said signal receiving device; and wherein at least one said frequency conversion device comprises:

i. at least one first filter for receiving said input signal block from said interface device to provide filtering of the signals comprising said input signal block;

ii. at least one first frequency mixer for receiving said filtered input signal block to shift the signals comprising said filtered input signal block to at least one intermediate frequency range;

iii. at least one second filter for receiving and providing filtering to the signals comprising said intermediate frequency signal block;

iv. at least one first amplifier for receiving and providing amplification to the signals comprising said filtered intermediate frequency signal block;

v. at least one second frequency mixer for receiving and selectably converting the signals comprising said amplified intermediate frequency signal block to said converted frequency range;

vi. at least one third filter for receiving and selectably providing filtering to the signals comprising said frequency converted signal block for output to at least one said interface device.

2. A system for receiving a plurality of first electrical communications signals input from at least one first signal source and a plurality of second electrical communications signals input from at least one second signal source to distribute for output to least one first or second signal receiving device, comprising:

A. at least one first interface device for receiving and combining said first input signals into a first input signal block within a predetermined first frequency range;

B. at least one frequency conversion device electrically connected to at least one said first interface device for receiving and shifting said first input signal block from said first frequency range to at least two other frequency ranges for conversion to a converted frequency range;

C. at least one second interface device electrically connected to at least one said frequency conversion device for receiving and combining said frequency converted first signal block with said second input signals such that said combined signal is output to at least one said second signal receiving device;

wherein at least said first interface device receives said frequency converted first signal block from at least one said frequency conversion device for output to at least one said first signal receiving device;

wherein at least one said frequency conversion device comprises:

i. at least one first filter for receiving said first input signal block from said interface device to provide filtering of the signals comprising said first input signal block;

ii. at least one first frequency mixer for receiving said filtered first input signal block to shift the signals comprising said filtered first input signal block to at least one intermediate frequency range;

iii. at least one second filter for receiving and providing filtering to the signals comprising said intermediate frequency first signal block;

iv. at least one first amplifier for receiving and providing amplification to the signals comprising said filtered intermediate frequency first signal block;

v. at least one second frequency mixer for receiving and selectably converting the signals comprising said amplified intermediate frequency first signal block to said converted frequency range;

vi. at least one third filter for receiving and selectably providing filtering to the signals comprising said frequency converted first signal block for output to at least one said first or second interface device.

3. The system of claim 1 or 2, wherein at least one said frequency conversion device further comprises:

vii. at least one phase shifting device for receiving and converting said filtered input signal block into at least two phase-shifted signal blocks for output to said first frequency mixer;

viii. at least one transformer for receiving and combining said intermediate frequency signal blocks after output from said first frequency mixer.

4. The system of claim 1 or 2, wherein at least one said frequency conversion device further comprises at least one signal attenuation device for providing attenuation to said signals received by said frequency conversion device.

5. The system of claim 1 or 2, wherein at least one said frequency conversion device further comprises at least one second amplifier for providing amplification to said signals received by said frequency conversion device.

6. The system of claim 1 or 2, wherein at least one said filter comprises a passive filter network.

7. The system of claim 1 or 2, wherein at least one said filter comprises an active filter network.

8. The system of claim 1 or 2, wherein at least one said filter has a corner frequency of approximately 150 MHz.

9. The system of claim 1 or 2, wherein at least one said frequency mixer comprises a voltage controlled oscillator circuit incorporating a phase-lock loop for maintaining said first frequency mixer at an output frequency within said intermediate frequency range.

10. The system of claim 1 or 2, wherein at least one said frequency mixer is comprised of an analog circuit.

11. The system of claim 1 or 2, wherein at least one said frequency mixer is comprised of a digital circuit.

12. The system of claim 9, wherein said voltage controlled oscillator circuit is of electronic component design.

13. The system of claim 9, wherein said voltage controlled oscillator circuit is of integrated circuit design.

14. The system of claim 1 or 2, wherein at least one said first frequency mixer shifts the frequency of said filtered input signal block by at least 1000 MHz.

15. The system of claim 1 or 2, wherein at least one said second filter eliminates harmonic frequency sideband components from said intermediate frequency signal block.

16. The system of claim 1 or 2, wherein at least one said second filter is comprised of a passive filtering network.

17. The system of claim 1 or 2, wherein at least one said second filter is comprised of an active filtering network.

18. The system of claim 1 or 2, wherein at least one said second filter is comprised of a digital filtering network.

19. The system of claim 1 or 2, wherein at least one said first amplifier provides sufficient amplification to said filtered intermediate frequency signal block to allow adequate reception of said frequency converted signal block by at least one said signal receiving device.

20. The system of claim 1 or 2, wherein at least one said first amplifier provides high gain and low noise to said filtered intermediate frequency signal block.

21. The system of claim 1 or 2, wherein at least one said first amplifier provides approximately 38 dB of amplification to said filtered intermediate frequency signal block.

22. The system of claim 1 or 2, wherein at least one said amplifier is comprised of electronic components.

23. The system of claim 1 or 2, wherein at least one said amplifier is comprised of integrated circuit components.

24. The system of claim 1 or 2, wherein at least one said second frequency mixer combines said amplified intermediate frequency signal block with at least one other intermediate frequency signal to convert said amplified intermediate frequency signal block to said converted frequency range.

25. The system of claim 24, wherein at least one said other intermediate frequency signal is at least 1264 MHz.

26. The system of claim 24, wherein at said converted frequency range is approximately 318–414 MHz.

27. The system of claim 24, wherein at least one said other intermediate frequency signal is at least 1396 MHz.

28. The system of claim 24, wherein said converted frequency range is approximately 450–546 MHz.

29. The system of claim 24, wherein at least one said other intermediate frequency signal is formed from a double frequency multiple of a sideband signal produced by at least one said first frequency mixer.

30. The system of claim 24, wherein at least one said other intermediate frequency signal is formed from a triple frequency multiple of a sideband signal produced by at least one said first frequency mixer.

31. The system of claim 29, wherein said sideband signal is approximately 132 MHz.

32. The system of claim 30, wherein said sideband signal is approximately 132 MHz.

33. The system of claim 1 or 2, wherein at least one said third filter is tunable to a corner frequency of approximately 414 MHz.

34. The system of claim 1 or 2, wherein at least one said third filter is tunable to a corner frequency of approximately 546 MHz.

35. The system of claim 1 or 2, wherein at least one said interface device comprises a splitter/combiner.

36. The system of claim 35, wherein at least one said interface device comprises an active splitter/combiner.

37. The system of claim 35 wherein at least one said interface device comprises an eight-to-one splitter/combiner.

38. The system of claim 3, wherein at least one said phase shifting device comprises a broad-band quadrature signal phase shifting circuit in which said filtered signal block is converted into two output signal blocks which are 90 degrees out of phase with respect to each other.

39. The system of claim 3, wherein at least one said first mixer separately shifts the frequency of each said phase-shifted signal block by at least 1000 MHz.

40. The system of claim 3, wherein at least one said transformer combines said intermediate frequency signal blocks into a combined signal block having a minimum frequency of 1054 MHz.

41. The system of claim 3, wherein at least one said transformer is comprised of a balun transformer.

42. The system of claim 1 or 2, wherein at least one said first frequency mixer shifts the frequency of said filtered input signal block by at least 264 MHz.

43. The system of claim 1 or 2, wherein at least one said first frequency mixer shifts the frequency of said filtered input signal block by at least 396 MHz.

44. The system of claim 1 or 2, wherein at said converted frequency range is approximately 318–414 MHz.

45. The system of claim 1 or 2, wherein said converted frequency range is approximately 450–546 MHz.

46. The system of claim 1 or 2, wherein at least one said second filter is tunable to a corner frequency of approximately 414 MHz.

47. The system of claim 1 or 2, wherein at least one said second filter is tunable to a corner frequency of approximately 546 MHz.

* * * * *